US012650956B2

(12) United States Patent
Li

(10) Patent No.: US 12,650,956 B2
(45) Date of Patent: Jun. 9, 2026

(54) ESTABLISHING METHOD OF REMOTE REPLICATION RELATIONSHIP AND RELATED APPARATUS

(71) Applicant: SUZHOU METABRAIN INTELLIGENT TECHNOLOGY CO., LTD., Suzhou (CN)

(72) Inventor: Fenxiang Li, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/979,545

(22) Filed: Dec. 12, 2024

(65) Prior Publication Data

US 2025/0110926 A1 Apr. 3, 2025

Related U.S. Application Data

(63) Continuation-in-part of application No. PCT/CN2023/108186, filed on Jul. 19, 2023.

(30) Foreign Application Priority Data

Nov. 30, 2022 (CN) .......................... 202211518341.9

(51) Int. Cl.
*G06F 16/178* (2019.01)

(52) U.S. Cl.
CPC ................................. *G06F 16/178* (2019.01)

(58) Field of Classification Search
CPC ..................................................... G06F 16/178
USPC ......................................................... 707/620
See application file for complete search history.

(56) References Cited

U.S. PATENT DOCUMENTS

| | | | |
|---|---|---|---|
| 6,643,795 B1 | 11/2003 | Sicola et al. | |
| 9,992,155 B2 * | 6/2018 | Pannese | H04L 67/1097 |
| 10,756,953 B1 * | 8/2020 | Jain | H04L 41/0668 |
| 11,016,694 B1 * | 5/2021 | Roytman | G06F 3/067 |

(Continued)

FOREIGN PATENT DOCUMENTS

| | | |
|---|---|---|
| CN | 108363551 A | 8/2018 |
| CN | 113691414 A | 11/2021 |

(Continued)

*Primary Examiner* — Cam Linh T Nguyen
(74) *Attorney, Agent, or Firm* — IPro, PLLC

(57) ABSTRACT

An establishing method of a remote replication relationship includes: based on a port group of a local device, a port group of a remote device, and a virtual Internet-Protocol-address datum corresponding to each of port groups, generating a replication-link table; based on service-requirement information, selecting a corresponding replication link from the replication-link table; and based on the replication link, establishing a remote replication relationship between the local device and the remote device that are corresponding to each other, and performing remote replication. Because the replication-link table of the port groups is employed, the applied replication link is not a replication link of fixed IPs, and when a failure happens, quick switching may be performed based on the virtual Internet Protocol address, which prevents the problem of failures caused by the usage of fixed IPs, thereby improving the stability of the remote replication relationship established in the storing system.

18 Claims, 4 Drawing Sheets

(56) References Cited

U.S. PATENT DOCUMENTS

| | | | |
|---|---|---|---|
| 11,436,097 B1* | 9/2022 | Kumar | G06F 3/0668 |
| 2014/0219101 A1* | 8/2014 | Horovitz | H04L 63/1408 |
| | | | 370/236 |
| 2017/0318089 A1* | 11/2017 | Pandit | G06F 11/2069 |
| 2022/0229605 A1* | 7/2022 | Degwekar | G06F 3/0604 |
| 2022/0229851 A1* | 7/2022 | Danilov | G06F 3/0619 |
| 2023/0036715 A1* | 2/2023 | Sinha | H04L 12/1804 |
| 2023/0333777 A1* | 10/2023 | Shveidel | G06F 3/0619 |

FOREIGN PATENT DOCUMENTS

| | | | |
|---|---|---|---|
| CN | 114090342 A | 2/2022 |
| CN | 115174596 A | 10/2022 |
| CN | 115550287 A | 12/2022 |
| EP | 2854351 A1 | 4/2015 |

* cited by examiner

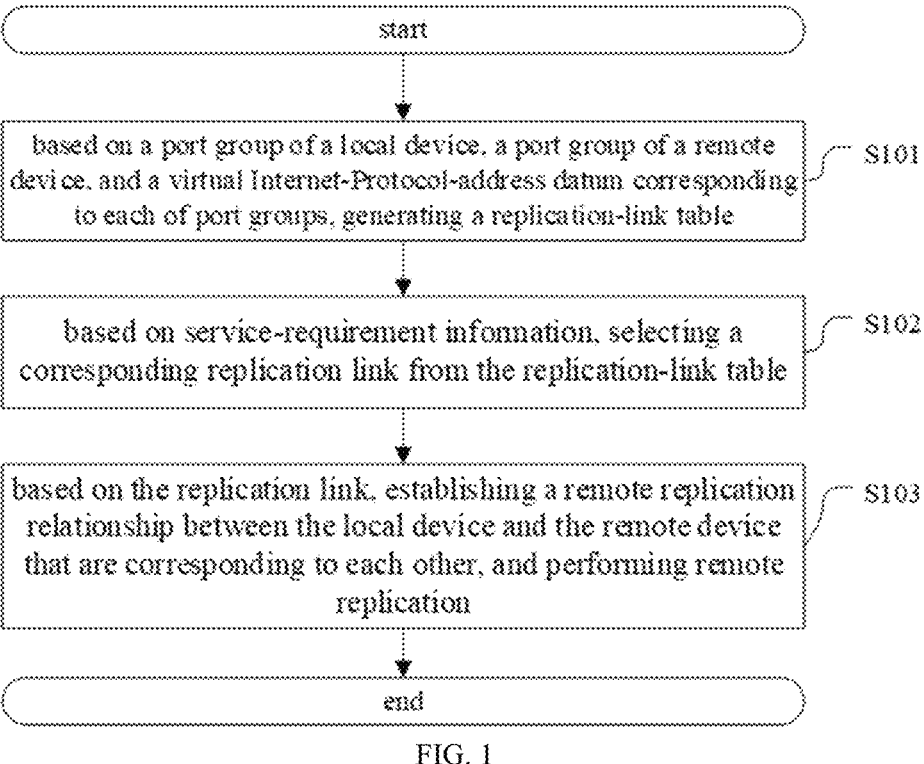

start based on a port group of a local device, a port group of a remote device, and a virtual Internet-Protocol-address datum corresponding to each of port groups, generating a replication-link table          S101 based on service-requirement information, selecting a corresponding replication link from the replication-link table          S102 based on the replication link, establishing a remote replication relationship between the local device and the remote device that are corresponding to each other, and performing remote replication          S103 end

FIG. 1

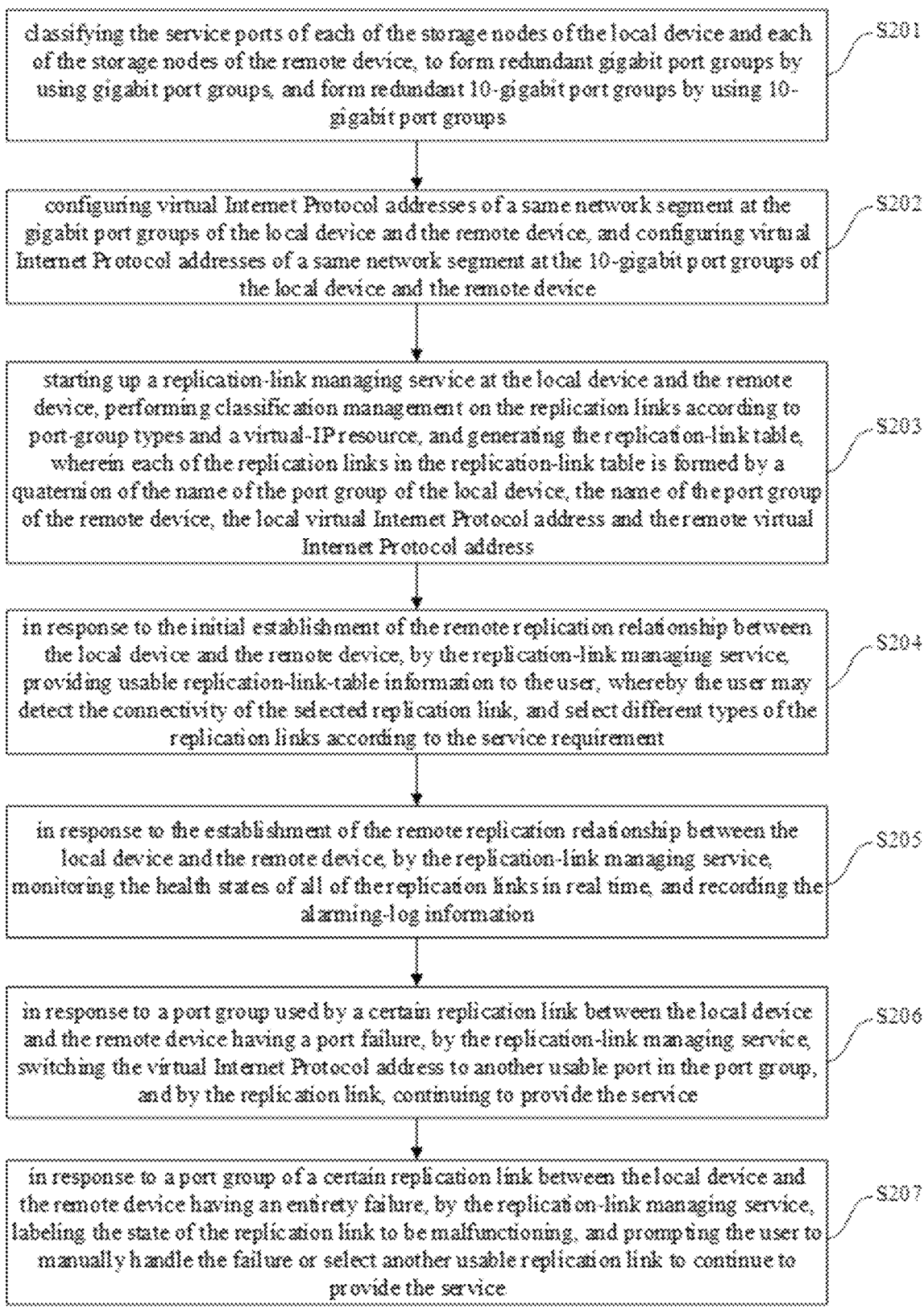

classifying the service ports of each of the storage nodes of the local device and each of the storage nodes of the remote device, to form redundant gigabit port groups by using gigabit port groups, and form redundant 10-gigabit port groups by using 10-gigabit port groups ⌐S201 configuring virtual Internet Protocol addresses of a same network segment at the gigabit port groups of the local device and the remote device, and configuring virtual Internet Protocol addresses of a same network segment at the 10-gigabit port groups of the local device and the remote device ⌐S202 starting up a replication-link managing service at the local device and the remote device, performing classification management on the replication links according to port-group types and a virtual-IP resource, and generating the replication-link table, wherein each of the replication links in the replication-link table is formed by a quaternion of the name of the port group of the local device, the name of the port group of the remote device, the local virtual Internet Protocol address and the remote virtual Internet Protocol address ⌐S203 in response to the initial establishment of the remote replication relationship between the local device and the remote device, by the replication-link managing service, providing usable replication-link-table information to the user, whereby the user may detect the connectivity of the selected replication link, and select different types of the replication links according to the service requirement ⌐S204 in response to the establishment of the remote replication relationship between the local device and the remote device, by the replication-link managing service, monitoring the health states of all of the replication links in real time, and recording the alarming-log information ⌐S205 in response to a port group used by a certain replication link between the local device and the remote device having a port failure, by the replication-link managing service, switching the virtual Internet Protocol address to another usable port in the port group, and by the replication link, continuing to provide the service ⌐S206 in response to a port group of a certain replication link between the local device and the remote device having an entirety failure, by the replication-link managing service, labeling the state of the replication link to be malfunctioning, and prompting the user to manually handle the failure or select another usable replication link to continue to provide the service ⌐S207

FIG. 2

ESTABLISHING METHOD OF REMOTE REPLICATION RELATIONSHIP AND RELATED APPARATUS

CROSS-REFERENCE TO RELATED APPLICATION

The present application claims the priority of the Chinese patent application filed on Nov. 30, 2022 before the CNIPA, China National Intellectual Property Administration with the application number of 202211518341.9 and the title of "ESTABLISHING METHOD OF REMOTE REPLICA-TION RELATIONSHIP AND RELATED APPARATUS", which is incorporated herein in its entirety by reference.

FIELD

The present application relates to the technical field of computers and more particularly, to an establishing method of a remote replication relationship, an establishing appara-tus, a computing device and a non-transitory readable stor-age medium.

BACKGROUND

In the technique of storing systems, the disaster-recovery strategy based on the technique of remote replication is one of the critical techniques of the storing systems for data protection, and may effectively solve the problem of single-point failure of the storing systems. In the technique of remote replication, when a remote replication relationship between a local device and a remote device is established, it is required to specify a replication link, to realize the data reproduction and synchronization between the devices, and the usability and the stability of the replication link are very important.

In the related art, the replication-link managing solution mainly uses the network ports of various controllers of the storing system, to configure the fixed IP (Internet Protocol) addresses, and by intersecting interconnection, forms the replication links between the local device and the remote device. If the quantity of the controllers in the storing system is n, the quantity of the replication links is n*n. After the local device and the remote device have established the remote replication relationship based on the selected repli-cation link, both of the data changes of the local device and the remote device are synchronized via the replication link.

SUMMARY

An establishing method of a remote replication relation-ship, an establishing apparatus, a computing device and a non-transitory readable storage medium are provided, to improve the stability of the remote replication relationship established in the storing system.

In order to solve the above technical problem, the present application provides an establishing method of a remote replication relationship, and the method includes:

based on a port group of a local device, a port group of a remote device, and a virtual Internet-Protocol-address datum corresponding to each of port groups, generating a replication-link table;

based on service-requirement information, selecting a corresponding replication link from the replication-link table; and based on the replication link, establishing a remote rep-lication relationship between the local device and the remote device that are corresponding to each other, and performing remote replication.

In some embodiments, based on the port group of the local device, the port group of the remote device, and the virtual Internet-Protocol-address datum corresponding to each of the port groups, generating the replication-link table includes:

classifying service ports of each of storage nodes of the local device, to obtain the port group of the local device;

classifying service ports of each of storage nodes of the remote device, to obtain the port group of the remote device;

performing virtual-Internet-Protocol-address configuring to each of the port groups of the local device and each of the port groups of the remote device, to obtain the virtual Internet-Protocol-address datum corresponding to each of the port groups; and based on each of the port groups of the local device, each of the port groups of the remote device, and the virtual Internet-Protocol-address datum corresponding to each of the port groups, generating the replication-link table, wherein data of each of replication links in the repli-cation-link table include a name of the port group of the local device, a name of the port group of the remote device, a local virtual Internet Protocol address and a remote virtual Internet Protocol address.

In some embodiments, classifying the service ports of each of the storage nodes of the local device, to obtain the port group of the local device includes:

accumulating ports of storage nodes of a same controller in the service ports of each of the storage nodes of the local device, to obtain redundant ports, wherein the ports include a gigabit port and/or a 10-gigabit port; and by using ports of storage nodes of different controllers in the service ports of each of the storage nodes of the local device and all of the redundant ports, forming the port group of the local device.

In some embodiments, classifying the service ports of each of the storage nodes of the remote device, to obtain the port group of the remote device includes:

accumulating ports of storage nodes of a same controller in the service ports of each of the storage nodes of the remote device, to obtain redundant ports, wherein the ports include a gigabit port and/or a 10-gigabit port; and by using ports of storage nodes of different controllers in the service ports of each of the storage nodes of the remote device and all of the redundant ports, forming the port group of the remote device.

In some embodiments, performing virtual-Internet-Proto-col-address configuring to each of the port groups of the local device and each of the port groups of the remote device, to obtain the virtual Internet-Protocol-address datum corresponding to each of the port groups includes:

performing same-network-segment virtual-Internet-Pro-tocol-address configuring to each of the port groups of the local device and each of the port groups of the remote device, to obtain the virtual Internet-Protocol-address datum corresponding to each of the port groups.

In some embodiments, the port groups include a gigabit port group and a 10-gigabit port group, and based on each of the port groups of the local device, each of the port groups of the remote device, and the virtual Internet-Protocol-address datum corresponding to each of the port groups, generating the replication-link table includes:

based on each of gigabit port groups of the local device, the each of gigabit port groups of the remote device, and the virtual Internet-Protocol-address datum corresponding to each of the gigabit port groups, generating a gigabit replication-link table; and based on each of 10-gigabit port groups of the local device, each of 10-gigabit port groups of the remote device, and the virtual Internet-Protocol-address datum corresponding to each of the 10-gigabit port groups, generating a 10-gigabit replication-link table.

In some embodiments, based on the service-requirement information, selecting the corresponding replication link from the replication-link table includes:

based on the service-requirement information, selecting an initial replication link from the replication-link table;

performing connectivity check to the initial replication link; and when the connectivity check passes, using the initial replication link as the replication link.

In some embodiments, based on the service-requirement information, selecting the initial replication link from the replication-link table includes:

based on a data-synchronization speed in the service-requirement information, selecting the initial replication link from the replication-link table.

In some embodiments, the replication-link table includes a gigabit replication-link table and a 10-gigabit replication-link table, and based on the data-synchronization speed in the service-requirement information, selecting the initial replication link from the replication-link table includes:

when the data-synchronization speed is greater than a preset speed, selecting the initial replication link from the 10-gigabit replication-link table; and when the data-synchronization speed is less than or equal to the preset speed, selecting the initial replication link from the gigabit replication-link table.

In some embodiments, performing the connectivity check to the initial replication link includes:

performing the connectivity check to the initial replication link by using a ping instruction.

In some embodiments, based on the replication link, establishing the remote replication relationship between the local device and the remote device that are corresponding to each other, and performing the remote replication includes:

based on a virtual Internet Protocol address corresponding to the local device and a virtual Internet Protocol address corresponding to the remote device in the replication link, performing establishing-instruction transmission; and based on the received establishing instruction, establishing the remote replication relationship between the local device and the corresponding remote device, and performing the remote replication.

In some embodiments, the method further includes:

after the local device and the remote device have established the remote replication relationship, monitoring health-state data of all of replication links in real time, and recording alarming-log information.

In some embodiments, the method further includes:

sending the health-state data to a terminal of a user with a preset period.

In some embodiments, the method further includes:

when a port in the port groups corresponding to the replication link malfunctions, switching the virtual Internet Protocol address corresponding to the port groups to another usable port in the port groups, and performing data reproduction based on a new port corresponding to the replication link.

In some embodiments, the method further includes:

when a port in the port groups corresponding to the replication link malfunctions, recording failure information, and writing the failure information into alarming-log information.

In some embodiments, the method further includes:

when a port group corresponding to the replication link malfunctions, labeling a state of the replication link to be malfunctioning, and sending a port-group-malfunctioning message.

In some embodiments, the method further includes:

selecting another usable replication link, and providing service based on the replication link.

The present application further provides an establishing apparatus of a remote replication relationship, and the apparatus includes:

a link-table establishing module configured for, based on a port group of a local device, a port group of a remote device, and a virtual Internet-Protocol-address datum corresponding to each of port groups, generating a replication-link table;

a link selecting module configured for, based on service-requirement information, selecting a corresponding replication link from the replication-link table; and a replication relationship establishing module configured for, based on the replication link, establishing a remote replication relationship between the local device and the remote device that are corresponding to each other, and performing remote replication.

The present application further provides a computing device, and the computing device includes:

a memory configured for storing a computer program; and a processor configured for, when executing the computer program, implementing the steps of the establishing method of a remote replication relationship stated above.

The present application further provides a non-transitory readable storage medium, and the non-transitory readable storage medium stores a computer program, and the computer program, when executed by a processor, implements the steps of the establishing method of a remote replication relationship stated above.

The establishing method of the remote replication relationship according to the present application includes: based on a port group of a local device, a port group of a remote device, and a virtual Internet-Protocol-address datum corresponding to each of the port groups, generating a replication-link table; based on service-requirement information, selecting a corresponding replication link from the replication-link table; and based on the replication link, establishing a remote replication relationship between the local device and the remote device that are corresponding to each other, and performing remote replication.

By firstly generating the replication-link table based on the port groups, and subsequently establishing the remote replication relationship based on the selected replication link, remote replication is realized. Because the replication-link table of the port groups is employed, the applied replication link is not a replication link of fixed IPs, and when a failure happens, quick switching may be performed based on the virtual Internet Protocol address, which prevents the problem of failures caused by the usage of fixed IPs, thereby improving the stability of the remote replication relationship established in the storing system.

The present application further provides an establishing apparatus of a remote replication relationship, a computing device and a non-transitory readable storage medium, which have the above-described advantageous effects, and are not discussed further herein.

BRIEF DESCRIPTION OF THE DRAWINGS

In order to more clearly illustrate the technical solutions of the embodiments of the present application or the prior art, the figures that are required to describe the embodiments or the prior art will be briefly described below. Apparently, the figures that are described below are merely embodiments of the present application, and a person skilled in the art may obtain other figures according to the provided figures without paying creative work.

FIG. 1 is a flow chart of an establishing method of a remote replication relationship according to an embodiment of the present application;

FIG. 2 is a flow chart of another establishing method of a remote replication relationship according to an embodiment of the present application;

DETAILED DESCRIPTION

Figures 3, 4:
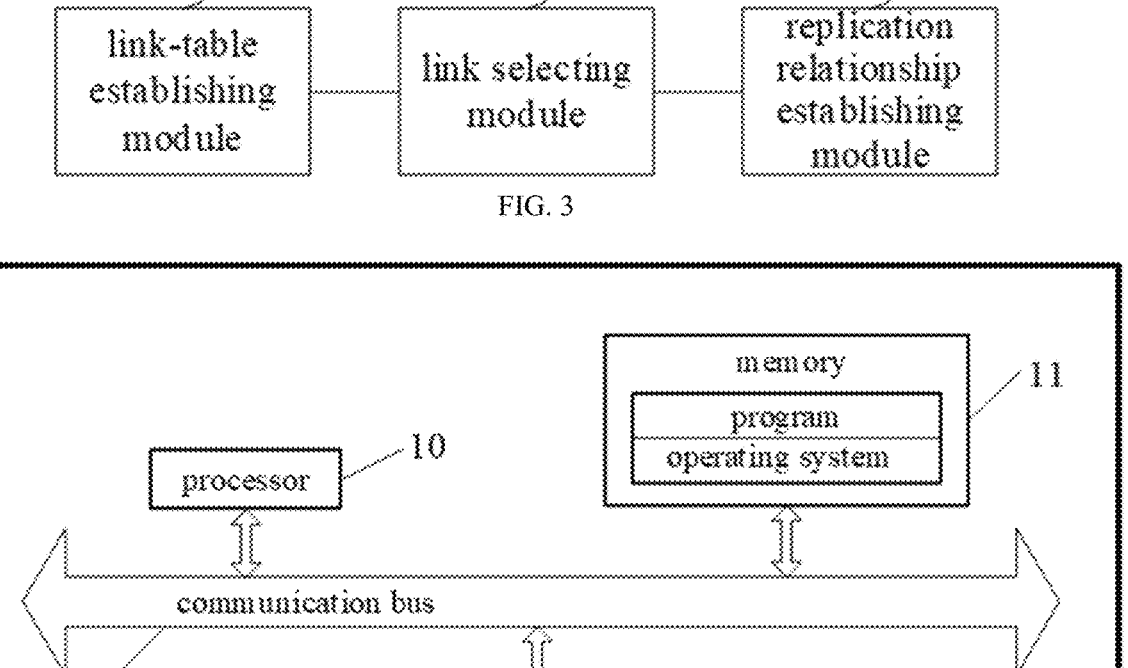
FIG. 3 is a schematic structural diagram of an establishing apparatus of a remote replication relationship according to an embodiment of the present application.
FIG. 4 is a schematic structural diagram of a computing device according to an embodiment of the present application.

The core of the present application is to provide an establishing method of a remote replication relationship, an establishing apparatus, a computing device and a non-transitory readable storage medium, to improve the stability of the remote replication relationship established in the storing system.

In order to make the objects, the technical solutions and the advantages of the embodiments of the present application clearer, the technical solutions according to the embodiments of the present application will be clearly and completely described below with reference to the drawings according to the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In the related art, the replication-link managing solution mainly uses the network ports of the controllers of the storing system, to configure the fixed IP addresses, and by intersecting interconnection, forms the replication links between the local device and the remote device. If the quantity of the controllers in the storing system is n, the quantity of the replication links is n*n. After the local device and the remote device have established the remote replication relationship based on the selected replication link, both of the data changes of the local device and the remote device are synchronized via the replication link. However, when the quantity of the controllers in the storing system has grown to a large scale, the difficulty in the link management increases, and the lateral expansion of the controllers of the storing system cannot be effectively performed. Moreover, when a certain node or a certain replication link malfunctions, because of the fixed IP, that might affect the other replication links, which causes that the replication links are unusable, which affects the stability of the storing system.

Therefore, the present application provides an establishing method of a remote replication relationship. By firstly generating the replication-link table based on the port groups, and subsequently establishing the remote replication relationship based on the selected replication link, remote replication is realized. Because the replication-link table of the port groups is employed, the applied replication link is not a replication link of fixed IPs, and when a failure happens, quick switching may be performed based on the virtual Internet Protocol address, which prevents the problem of failures caused by the usage of fixed IPs, thereby improving the stability of the remote replication relationship established in the storing system.

The establishing method of a remote replication relationship according to the present application will be described below with reference to an embodiment.

Figure 5:
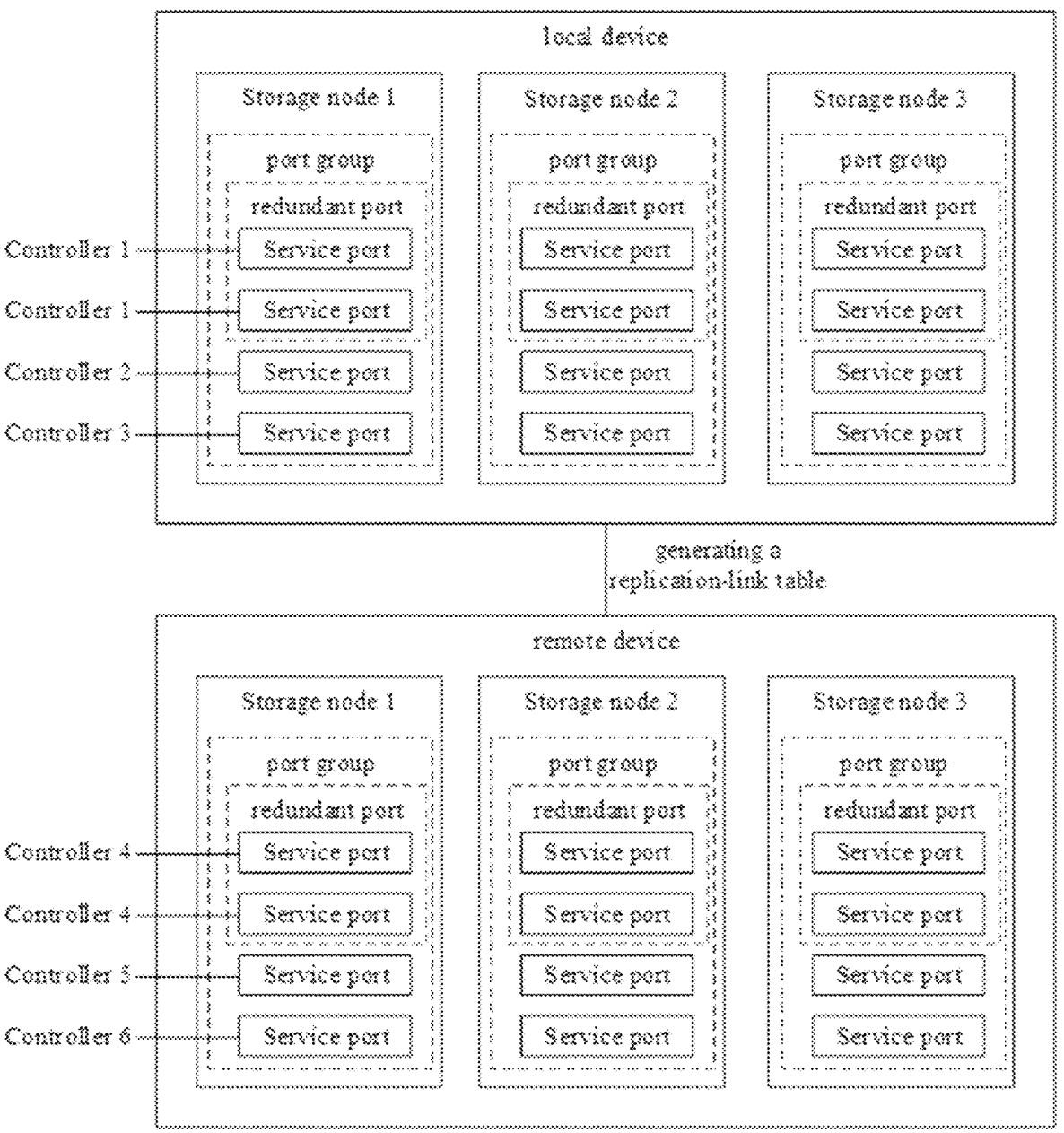
FIG. 5 is a schematic structural diagram of a local device and a remote device according to an embodiment of the present application.

Referring to FIG. 1 and FIG. 5, FIG. 1 is a flow chart of an establishing method of a remote replication relationship according to an embodiment of the present application, and FIG. 5 is a schematic structural diagram of a local device and a remote device according to an embodiment of the present application.

In the present embodiment, the method may include:

S101: based on a port group of a local device, a port group of a remote device, and a virtual Internet-Protocol-address datum corresponding to each of the port groups, generating a replication-link table.

This step aims at, based on the port group of the local device, the port group of the remote device, and the virtual Internet-Protocol-address datum corresponding to each of the port groups, generating the replication-link table.

The port groups are redundant port groups obtained by classification of multiple ports. In other words, the same service ports are accumulated into one port. Subsequently, the corresponding replication-link table is formed, in which the virtual Internet Protocol addresses in each of the replication links correspond to multiple ports. When a ports failure happens, the virtual Internet Protocol addresses may be maintained unchanged, and the ports are updated to continue the remote replication.

In some embodiments, this step may include:

S1011: classifying service ports of each of storage nodes of the local device, to obtain the port group of the local device;

S1012: classifying service ports of each of storage nodes of the remote device, to obtain the port group of the remote device;

S1013: performing virtual-Internet-Protocol-address configuring to each of port groups of the local device and each of port groups of the remote device, to obtain the virtual Internet-Protocol-address datum corresponding to each of the port groups; and S1014: based on each of the port groups of the local device, each of the port groups of the remote device, and the virtual Internet-Protocol-address datum corresponding to each of the port groups, generating the replication-link table, wherein data of each of replication links in the replication-link table include a name of the port group of the local device, a name of the port group of the remote device, a local virtual Internet Protocol address and a remote virtual Internet Protocol address.

It can be seen that this alternative solution mainly describes how to generate the replication-link table. In this alternative solution, the service ports of each of the storage nodes of the local device are classified, to obtain the port group of the local device; the service ports of each of the storage nodes of the remote device are classified, to obtain the port group of the remote device; virtual-Internet-Protocol-address configuring is performed to each of the port groups of the local device and each of the port groups of the remote device, to obtain the virtual Internet-Protocol-address datum corresponding to each of the port groups; and based on each of the port groups of the local device, each of the port groups of the remote device, and the virtual Internet-Protocol-address datum corresponding to each of the port groups, the replication-link table is generated. Among them, the data of each of the replication links in the replication-link table include the name of the port group of the local device, the name of the port group of the remote device, the local virtual Internet Protocol address and the remote virtual Internet Protocol address. The replication-link table has redundant ports, which may be switched in failure, thereby realizing a flexible replication relation, and improving the reliability of the replication relation.

In some embodiments, S1011 in the above alternative solution may include:

Step 1: accumulating ports of storage nodes of a same controller in the service ports of each of the storage nodes of the local device, to obtain redundant ports, wherein the ports include a gigabit port and/or a 10-gigabit port; and Step 2: by using ports of storage nodes of different controllers in the service ports of each of the storage nodes of the local device and all of the redundant ports, forming the port group of the local device.

It can be seen that this alternative solution mainly describes how to establish the port group. In this alternative solution, the ports of the storage nodes of the same controller in the service ports of each of the storage nodes of the local device are accumulated, to obtain redundant ports. Among them, the ports include a gigabit port and/or a 10-gigabit port; and by using the ports of the storage nodes of the different controllers in the service ports of each of the storage nodes of the local device and all of the redundant ports, the port group of the local device is formed.

In some embodiments, S1012 in the above alternative solution may include:

Step 1: accumulating ports of storage nodes of a same controller in the service ports of each of the storage nodes of the remote device, to obtain redundant ports, wherein the ports include a gigabit port and/or a 10-gigabit port; and Step 2: by using ports of storage nodes of different controllers in the service ports of each of the storage nodes of the remote device and all of the redundant ports, forming the port group of the remote device.

It can be seen that this alternative solution mainly describes how to establish the port group. In this alternative solution, the ports of the storage nodes of the same controller in the service ports of each of the storage nodes of the remote device are accumulated, to obtain redundant ports. Among them, the ports include a gigabit port and/or a 10-gigabit port; and by using the ports of the storage nodes of the different controllers in the service ports of each of the storage nodes of the remote device and all of the redundant ports, the port group of the remote device is formed.

In some embodiments, S1013 in the above alternative solution may include:

performing same-network-segment virtual-Internet-Protocol-address configuring to each of the port groups of the local device and each of the port groups of the remote device, to obtain the virtual Internet-Protocol-address datum corresponding to each of the port groups.

It can be seen that this alternative solution mainly describes how to configure the virtual Internet Protocol addresses. In this alternative solution, same-network-segment virtual-Internet-Protocol-address configuring is performed to each of the port groups of the local device and each of the port groups of the remote device, to obtain the virtual Internet-Protocol-address datum corresponding to each of the port groups.

In some embodiments, S1014 in the above alternative solution may include:

based on each of gigabit port groups of the local device, each of gigabit port groups of the remote device, and the virtual Internet-Protocol-address datum corresponding to each of the gigabit port groups, generating a gigabit replication-link table; and based on each of 10-gigabit port groups of the local device, each of 10-gigabit port groups of the remote device, and the virtual Internet-Protocol-address datum corresponding to each of the 10-gigabit port groups, generating a 10-gigabit replication-link table.

It can be seen that this alternative solution mainly describes how to generate the replication-link table. In this alternative solution, based on each of the gigabit ports group of the local device, each of the gigabit port groups of the remote device, and the virtual Internet-Protocol-address datum corresponding to each of the gigabit port groups, the gigabit replication-link table is generated; and based on each of the 10-gigabit port groups of the local device, each of the 10-gigabit port groups of the remote device, and the virtual Internet-Protocol-address datum corresponding to each of the 10-gigabit port groups, the 10-gigabit replication-link table is generated.

S102: based on service-requirement information, selecting a corresponding replication link from the replication-link table.

On the basis of S101, this step aims at, based on service-requirement information, selecting the corresponding replication link from the replication-link table.

The service-requirement information includes but is not limited to the service speed, the hardware performance, the network bandwidth and so on.

In some embodiments, this step may include:

S1021: based on the service-requirement information, selecting an initial replication link from the replication-link table;

S1022: performing connectivity check to the initial replication link; and

S1023: when the connectivity check passes, using the initial replication link as the replication link.

It can be seen that this alternative solution mainly describes how to select the replication link. In this alternative solution, based on the service-requirement information, the initial replication link is selected from the replication-link table; the connectivity check is performed to the initial replication link; and when the connectivity check passes, the initial replication link is used as the replication link.

In some embodiments, S1021 in the above alternative solution may include:

based on a data-synchronization speed in the service-requirement information, selecting the initial replication link from the replication-link table.

It can be seen that this alternative solution mainly describes how to select the initial replication link. In this alternative solution, based on the data-synchronization speed in the service-requirement information, the initial replication link is selected from the replication-link table.

In some embodiments, S1021 in the above alternative solution may include:

Step 1: when the data-synchronization speed is greater than a preset speed, selecting the initial replication link from the 10-gigabit replication-link table; and Step 2: when the data-synchronization speed is less than or equal to the preset speed, selecting the initial replication link from the gigabit replication-link table.

It can be seen that this alternative solution mainly describes how to select the initial replication link. In this alternative solution, when the data-synchronization speed is greater than the preset speed, the initial replication link is selected from the 10-gigabit replication-link table; and when the data-synchronization speed is less than or equal to the preset speed, the initial replication link is selected from the gigabit replication-link table.

In some embodiments, S1022 in the above alternative solution may include:

performing the connectivity check to the initial replication link by using a ping instruction, so as to realize the connectivity check on the replication link.

S103: based on the replication link, establishing a remote replication relationship between the local device and the remote device that are corresponding to each other, and performing remote replication.

On the basis of S102, this step aims at, based on the replication link, establishing a remote replication relationship between the local device and the remote device that are corresponding to each other, and performing remote replication.

In some embodiments, this step may include:

Step 1: based on a virtual Internet Protocol address corresponding to the local device and a virtual Internet Protocol address corresponding to the remote device in the replication link, performing establishing-instruction transmission; and Step 2: based on the received establishing instruction, establishing the remote replication relationship between the local device and the remote device that are corresponding to each other, and performing the remote replication.

It can be seen that this alternative solution mainly describes how to establish the remote replication relationship. In this alternative solution, based on the virtual Internet Protocol address corresponding to the local device and the virtual Internet Protocol address corresponding to the remote device in the replication link, establishing-instruction transmission is performed; and based on the received establishing instruction, the remote replication relationship between the local device and the remote device that are corresponding to each other is established, and the remote replication is performed.

In some embodiments, the present embodiment may further include:

after the local device and the remote device have established the remote replication relationship, monitoring health-state data of all of the replication links in real time, and recording alarming-log information, so as to monitor the health degree of the remote replication relationship, to maintain updating in real time the corresponding health data.

In some embodiments, the present embodiment may further include:

sending the health-state data to a terminal of a user with a preset period, so that the user may timely determine the state of the replication relation.

In some embodiments, the present embodiment may further include:

when a port in the port groups corresponding to the replication link malfunctions, switching the virtual Internet Protocol address corresponding to the port groups to another usable port in the port groups, and performing data reproduction based on a new port corresponding to the replication link.

It can be seen that, in this alternative solution, by switching the ports, the replication link may be effectively repaired without changing the replication link in failure, which improves the reliability of the system.

In some embodiments, the present embodiment may further include:

when a port in the port groups corresponding to the replication link malfunctions, recording failure information, and writing the failure information into the alarming-log information.

In some embodiments, the present embodiment may further include:

when a port group corresponding to the replication link malfunctions, labeling a state of the replication link to be malfunctioning, and sending a port-group-malfunctioning message.

In some embodiments, the present embodiment may further include:

selecting another usable replication link, and providing service based on the replication link. It can be seen that, when large-scale port failures happen, which causes a problem of the port groups, the replication link may be switched directly.

In conclusion, in the present embodiment, by firstly generating the replication-link table based on the port groups, and subsequently establishing the remote replication relationship based on the selected replication link, remote replication is realized. Because the replication-link table of the port groups is employed, the applied replication link is not a replication link of fixed IPs, and when a failure happens, quick switching may be performed based on the virtual Internet Protocol address, which prevents the problem of failures caused by the usage of fixed IPs, thereby improving the stability of the remote replication relationship established in the storing system.

The establishing method of a remote replication relationship according to the present application will be described below with reference to another embodiment.

Referring to FIG. 2, FIG. 2 is a flow chart of another establishing method of a remote replication relationship according to an embodiment of the present application.

In the present embodiment, the method may include:

Step S201: classifying the service ports of each of the storage nodes of the local device and each of the storage nodes of the remote device, to form redundant gigabit port groups by using the gigabit port groups, and form redundant 10-gigabit port groups by using the 10-gigabit port groups;

Step S202: configuring virtual Internet Protocol addresses of the same network segment at the gigabit port groups of the local device and the remote device, and configuring virtual Internet Protocol addresses of the same network segment at the 10-gigabit port groups of the local device and the remote device;

Step S203: starting up a replication-link managing service at the local device and the remote device, performing classification management on the replication links according to the port-group types and the virtual-IP resource, and generating the replication-link table according to the port-group types and the virtual Internet-Protocol-address datum, wherein each of the replication links in the replication-link table is formed by a quaternion of the name of the port group of the local device, the name of the port group of the remote device, the local virtual Internet Protocol address and the remote virtual Internet Protocol address;

Step S204: in response to the initial establishment of the remote replication relationship between the local device and the remote device, by the replication-link managing service, providing usable replication-link-table information to the user, whereby the user may detect the connectivity of the selected replication link, and select different types of the replication links according to the service requirement;

Step S205: in response to the establishment of the remote replication relationship between the local device and the remote device, by the replication-link managing service, monitoring the health states of all of the replication links in real time, and recording the alarming-log information;

Step S206: in response to a port group used by a certain replication link between the local device and the remote device having a port failure, by the replication-link managing service, switching the virtual Internet Protocol address to another usable port in the port group, and by the replication link, continuing to provide the service; and Step S207: in response to a port group of a certain replication link between the local device and the remote device having an entirety failure, by the replication-link managing service, labeling the state of the replication link to be malfunctioning, and prompting the user to manually handle the failure or select another usable replication link to continue to provide the service.

The step of classifying the service ports of each of the storage nodes of the local device and each of the storage nodes of the remote device, to form the redundant gigabit port groups by using the gigabit port groups, and form the redundant 10-gigabit port groups by using the 10-gigabit port groups mainly includes the following steps:

providing a storage device, wherein the storage device is usually formed by one or more controller nodes, and the service ports in each of the controller nodes usually includes one or more gigabit ports and 10-gigabit ports;

in some embodiments, accumulating the service gigabit ports of the same controller node to form a redundant port, and accumulating the service 10-gigabit ports of the same controller node to form a redundant port; and forming the gigabit port group and the 10-gigabit port group by using the ports accumulated from the gigabit ports and the 10-gigabit ports of the different controllers respectively.

The step of configuring virtual Internet Protocol addresses of the same network segment at the gigabit port groups of the local device and the remote device, and configuring virtual Internet Protocol addresses of the same network segment at the 10-gigabit port groups of the local device and the remote device mainly includes the following steps:

configuring a virtual Internet Protocol address at the gigabit port group of the local device, whose primary port is attached to the gigabit port of a certain controller node of the local device, and configuring a virtual Internet Protocol address of the same network segment as the virtual Internet Protocol address of the local device at the gigabit port group of the remote device, whose primary port is attached to the gigabit port of a certain controller node of the remote device, wherein the local device and the remote device may be provided with multiple pairs of virtual Internet Protocol addresses; and configuring a virtual Internet Protocol address at the 10-gigabit port group of the local device, whose primary port is attached to the 10-gigabit port of a certain controller node of the local device, and configuring a virtual Internet Protocol address at the 10-gigabit port group of the remote device, whose primary port is attached to the 10-gigabit port of a certain controller node of the remote device, wherein the local device and the remote device may be provided with multiple pairs of virtual Internet Protocol addresses.

The step of starting up the replication-link managing service at the local device and the remote device, performing classification management on the replication links according to the port-group types and the virtual-IP resource, and generating the replication-link table according to the port-group types and the virtual Internet-Protocol-address datum, wherein each of the replication links in the replication-link table is formed by a quaternion of the name of the port group of the local device, the name of the port group of the remote device, the local virtual Internet Protocol address and the remote virtual Internet Protocol address mainly includes the following steps:

starting up the replication-link managing service at the local device and the remote device; and by the replication-link managing service, generating the gigabit replication-link table according to the gigabit port group and the virtual Internet-Protocol-address datum, and generating the 10-gigabit replication-link table according to the 10-gigabit port group and the virtual Internet-Protocol-address datum;

wherein each of the replication links in the replication-link table is formed by a quaternion of the name of the port group of the local device, the name of the port group of the remote device, the local virtual Internet Protocol address and the remote virtual Internet Protocol address.

The step of, in response to the initial establishment of the remote replication relationship between the local device and the remote device, by the replication-link managing service, providing usable replication-link-table information to the user, whereby the user may detect the connectivity of the selected replication link, and select different types of the replication links according to the service requirement mainly includes the following steps:

when the local device and the remote device initially establish the remote replication relationship, and it is required to select the used replication link, by the replication-link managing service, providing usable replication-link-table information to the user;

in some embodiments, by the user, when selecting the replication link, performing in advance the connectivity check on the replication link, and, by the replication-link managing service, returning replication-link-connectivity information to the user, and, if the replication link is not in connection, returning no-connection information to the user and prompting the user the probable reason for the no-connection of the replication link such as a network problem or a port failure; and in some embodiments, by the user, when selecting the replication link, selecting different types of the replication links according to the practical service requirement, for example, for a scene having a higher requirement on the data-synchronization speed, selecting a replication link of the 10-gigabit type, and, for a scene having a lower requirement on the data-synchronization speed, selecting a replication link of the gigabit type.

The step of, in response to the establishment of the remote replication relationship between the local device and the remote device, by the replication-link managing service, monitoring the health states of all of the replication links in real time, and recording the alarming-log information mainly includes the following steps:

after the local device and the remote device have established the remote replication relationship, by the replication-link managing service, receiving the request of data reproduction and synchronization, and performing the data transmission; and by the replication-link managing service, monitoring the health states of all of the replication links, reporting the health states of the replication links to the user in real time, and recording subsequent alarming-log information.

The step of, in response to the port group used by a certain replication link between the local device and the remote device having a port failure, by the replication-link managing service, switching the virtual Internet Protocol address to another usable port in the port group, and by the replication link, continuing to provide the service mainly includes the following steps:

when the primary port in a port group used by a certain replication link between the local device and the remote device malfunctions, by the replication-link managing service, switching the virtual Internet Protocol address to another usable port in the port group, and continuing to provide the service;

when a non-primary port in a port group used by a certain replication link between the local device and the remote device malfunctions, which does not affect the upper-layer service, by the replication link, continuing providing the service; and when a port group has a port failure, recording and writing the port failure into the alarming-log information.

The step of, in response to the port group of the certain replication link between the local device and the remote device having the entirety failure, by the replication-link managing service, labeling the state of the replication link to be malfunctioning, and prompting the user to manually handle the failure or select another usable replication link to continue to provide the service mainly includes the following steps:

when a port group of a certain replication link between the local device and the remote device has an entirety failure, by the replication-link managing service, labeling the state of the replication link to be malfunctioning;

by the replication-link managing service, prompting and notifying the user that it is required to manually handle the failure, which includes, if the replication link of the 10-gigabit type malfunctions while the replication link of the gigabit type is normal, prompting the user to use the replication link of the 10-gigabit type, and if the replication link of the gigabit type malfunctions while the replication link of the 10-gigabit type is normal, prompting the user to use the replication link of the 10-gigabit type, in which case, after the switching of the replication links, the service provision may continue;

if all of the replication links malfunction, by the replication-link managing service, prompting and notifying the user that it is required to manually handle the failure and checking the failure, wherein after the replication links are recovered, the service provision may continue; and by the replication-link managing service, writing the failure state and the prompting message into the alarming log, wherein after the replication links are recovered, the alarming ends automatically.

It can be seen that, in the present embodiment, by starting up a replication-link managing service at the local device and the remote device, performing graded management on the service gigabit port group and the service 10-gigabit port group of the local device and the remote device, and configuring the virtual Internet Protocol addresses to form the replication-link table, when the remote replication relationship is established, different types of the usable replication links may be selected according to the practical service requirement. The replication-link managing service monitors the states of the replication links in real time, and records the failure information to the alarming log, and when the replication links have a port or link failure in the range of the redundancy, the service provision may still continue, to realize the management on the remote replication link. The method solves the problems of the traditional replication-link managing solutions of a poor expansibility, a poor usability and a low stability of the storing system, and has the advantages such as easy expansion, a high usability and an improved stability of the storing system.

By starting up a replication-link managing service at the local device and the remote device, performing graded management on the service gigabit port group and the service 10-gigabit port group of the local device and the remote device, and configuring the virtual Internet Protocol addresses to form the replication-link table, when the remote replication relationship is established, different types of the usable replication links may be selected according to the practical service requirement. The replication-link managing service monitors the states of the replication links in real time, and records the failure information to the alarming log, and when the replication links have a port or link failure in the range of the redundancy, the service provision may still continue, to realize the management on the remote replication link. The method solves the problems of the traditional replication-link managing solutions of a poor expansibility, a poor usability and a low stability of the storing system, and has the advantages such as easy expansion, a high usability and an improved stability of the storing system.

It can be seen that, in the present embodiment, by firstly generating the replication-link table based on the port groups, and subsequently establishing the remote replication relationship based on the selected replication link, remote replication is realized. Because the replication-link table of the port groups is employed, the applied replication link is not a replication link of fixed IPs, and when a failure happens, quick switching may be performed based on the virtual Internet Protocol address, which prevents the problem of failures caused by the usage of fixed IPs, thereby improving the stability of the remote replication relationship established in the storing system.

An establishing apparatus of a remote replication relationship according to the embodiments of the present application will be described below. The establishing apparatus of a remote replication relationship described below and the establishing method of a remote replication relationship described above may correspondingly refer to each other.

Referring to FIG. 3, FIG. 3 is a schematic structural diagram of an establishing apparatus of a remote replication relationship according to an embodiment of the present application.

In the present embodiment, the apparatus may include:

a link-table establishing module 100 configured for, based on a port group of a local device, a port group of a remote device, and a virtual Internet-Protocol-address datum corresponding to each of the port groups, generating a replication-link table;

a link selecting module 200 configured for, based on service-requirement information, selecting a corresponding replication link from the replication-link table; and a replication relationship establishing module 300 configured for, based on the replication link, establishing a remote replication relationship between the local device and the remote device that are corresponding to each other, and performing remote replication.

In some embodiments, the link-table establishing module 100 may include:

a local-port classifying unit configured for classifying service ports of each of storage nodes of the local device, to obtain the port group of the local device;

a remote-port classifying unit configured for classifying service ports of each of storage nodes of the remote device, to obtain the port group of the remote device;

a virtual-Internet-Protocol-address configuring unit configured for performing virtual-Internet-Protocol-address configuring to each of the port groups of the local device and each of the port groups of the remote device, to obtain the virtual Internet-Protocol-address datum corresponding to each of the port groups; and a link-table establishing unit configured for, based on each of the port groups of the local device, each of the port groups of the remote device, and the virtual Internet-Protocol-address datum corresponding to each of the port groups, generating the replication-link table, wherein data of each of replication links in the replication-link table include a name of the port group of the local device, a name of the port group of the remote device, a local virtual Internet Protocol address and a remote virtual Internet Protocol address.

In some embodiments, the local-port classifying unit is configured for accumulating ports of storage nodes of a same controller in the service ports of each of the storage nodes of the local device, to obtain redundant ports, and the ports include a gigabit port and/or a 10-gigabit port; and by using ports of storage nodes of different controllers in the service ports of each of the storage nodes of the local device and all of the redundant ports, forming the port group of the local device.

In some embodiments, the remote-port classifying unit is configured for accumulating ports of storage nodes of a same controller in the service ports of each of the storage nodes of the remote device, to obtain redundant ports, and the ports include a gigabit port and/or a 10-gigabit port; and by using ports of storage nodes of different controllers in the service ports of each of the storage nodes of the remote device and all of the redundant ports, forming the port group of the remote device.

In some embodiments, the virtual-Internet-Protocol-address configuring unit is configured for performing same-network-segment virtual-Internet-Protocol-address configuring to each of the port groups of the local device and each of the port groups of the remote device, to obtain the virtual Internet-Protocol-address datum corresponding to each of the port groups.

In some embodiments, the link-table establishing unit is configured for, based on each of gigabit port groups of the local device, each of gigabit port group of the remote device, and the virtual Internet-Protocol-address datum corresponding to each of the gigabit port groups, generating a gigabit replication-link table; and based on each of the 10-gigabit port groups of the local device, each of the 10-gigabit port groups of the remote device, and the virtual Internet-Protocol-address datum corresponding to each of the 10-gigabit port groups, generating a 10-gigabit replication-link table.

In some embodiments, the link selecting module 200 is configured for, based on the service-requirement information, selecting an initial replication link from the replication-link table; performing connectivity check to the initial replication link; and when the connectivity check passes, using the initial replication link as the replication link.

In some embodiments, based on the service-requirement information, selecting the initial replication link from the replication-link table may include:

based on a data-synchronization speed in the service-requirement information, selecting the initial replication link from the replication-link table.

In some embodiments, the replication-link table includes a gigabit replication-link table and a 10-gigabit replication-link table, and the step of, based on the data-synchronization speed in the service-requirement information, selecting the initial replication link from the replication-link table may include:

when the data-synchronization speed is greater than a preset speed, selecting the initial replication link from the 10-gigabit replication-link table; and when the data-synchronization speed is less than or equal to the preset speed, selecting the initial replication link from the gigabit replication-link table.

In some embodiments, performing connectivity check to the initial replication link may include:

performing the connectivity check to the initial replication link by using a ping instruction.

In some embodiments, the replication relationship establishing module 300 is configured for, based on a virtual Internet Protocol address corresponding to the local device and a virtual Internet Protocol address corresponding to the remote device in the replication link, performing establishing-instruction transmission; and based on the received establishing instruction, establishing the remote replication relationship between the local device and the remote device that are corresponding to each other, and performing remote replication.

In some embodiments, the apparatus may further include:

a monitoring module configured for, after the local device and the remote device have established the remote replication relationship, monitoring health-state data of all of the replication links in real time, and recording alarming-log information.

In some embodiments, the apparatus may further include:
a monitored-information sending module configured for sending the health-state data to a terminal of a user with a preset period.

In some embodiments, the apparatus may further include:
a failure processing module configured for, when a port in the port groups corresponding to the replication link malfunctions, switching the virtual Internet Protocol address corresponding to the port groups to another usable port in the port groups, and performing the data reproduction based on the new port corresponding to the replication link.

In some embodiments, the apparatus may further include:
a failure-information writing module configured for, when a port in the port groups corresponding to the replication link malfunctions, recording failure information, and writing the failure information into the alarming-log information.

In some embodiments, the apparatus may further include:
a port-group-failure module configured for, when a port group corresponding to the replication link malfunctions, labeling a state of the replication link to be malfunctioning, and sending a port-group-malfunctioning message.

In some embodiments, the apparatus may further include:
a link switching module configured for selecting another usable replication link, and providing service based on the replication link.

It can be seen that, in the present embodiment, by firstly generating the replication-link table based on the port groups, and subsequently establishing the remote replication relationship based on the selected replication link, remote replication is realized. Because the replication-link table of the port groups is employed, the applied replication link is not a replication link of fixed IPs, and when a failure happens, quick switching may be performed based on the virtual Internet Protocol address, which prevents the problem of failures caused by the usage of fixed IPs, thereby improving the stability of the remote replication relationship established in the storing system.

The present application further provides a computing device. Referring to FIG. 4, FIG. 4 is a schematic structural diagram of a computing device according to an embodiment of the present application. The computing device may include:
a memory configured for storing a computer program; and
a processor configured for, when executing the computer program, implementing the steps of the establishing method of a remote replication relationship according to any one of the above embodiments.

As shown in FIG. 4, FIG. 4 is a schematic structural diagram of the formation of the computing device. The computing device may include a processor 20, a memory 11, a communication interface 12 and a communication bus 13. The processor 20, the memory 11 and the communication interface 12 complete the communication therebetween via the communication bus 13.

In an embodiment of the present application, the processor 20 may be a Central Processing Unit (CPU), an Application Specific Integrated Circuit, a Digital Signal Processor, a Field-Programmable Gate Array or another programmable logic device, and so on.

The processor 20 may invoke the program stored in the memory 11. The processor 20 may execute the operations in the embodiments of the establishing method of a remote replication relationship.

The memory 11 is configured for storing one or more programs. The program may contain a program code, and the program code contains a computer operation instruction. In an embodiment of the present application, the memory 11 stores at least a program configured for realizing the following function:
based on a port group of a local device, a port group of a remote device, and a virtual Internet-Protocol-address datum corresponding to each of the port groups, generating a replication-link table;
based on service-requirement information, selecting a corresponding replication link from the replication-link table; and
based on the replication link, establishing a remote replication relationship between the local device and the remote device that are corresponding to each other, and performing remote replication.

In an alternative implementation, the memory 11 may include a program storing region and a data storing region. The program storing region may store an operating system, application programs required by at least one function, and so on. The data storing region may store the data created in the usage.

Furthermore, the memory 11 may include a high-speed random access memory, and may also include a non-transitory memory, for example, at least one magnetic-disk storage device, or another transitory solid-state memory device.

The communication interface 12 may be an interface of a communication module, and is configured for connecting to other devices or systems.

Certainly, it should be noted that the structure shown in FIG. 4 does not limit the computing device according to the embodiments of the present application, and in practical applications the computing device may include more or fewer components than those shown in FIG. 4, or a combination of some of the components.

The present application further provides a non-transitory readable storage medium, and the non-transitory readable storage medium stores a computer program, and the computer program, when executed by a processor, may implement the steps of the establishing method of a remote replication relationship according to any one of the above embodiments.

The non-transitory readable storage medium may include various media that may store a program code, such as a USB flash disk, a mobile hard disk drive, a Read-Only Memory (ROM), a Random Access Memory (RAM), a diskette and an optical disk.

The description on the non-transitory readable storage medium according to the present application may refer to the above process embodiments, and is not discussed further in the present application.

The embodiments of the description are described in the mode of progression, each of the embodiments emphatically describes the differences from the other embodiments, and the same or similar parts of the embodiments may refer to each other. Regarding the devices according to the embodiments, because they correspond to the methods according to the embodiments, they are described simply, and the relevant parts may refer to the description on the methods.

A person skilled in the art may further understand that the units and the algorithm steps of the examples described with reference to the embodiments disclosed herein may be implemented by using electronic hardware, computer software or a combination thereof. In order to clearly explain the interchangeability between the hardware and the software, the above description has described generally the configurations and the steps of the examples according to the functions. Whether those functions are executed by hardware or software depends on the particular applications and the design constraints of the technical solutions. A person skilled in the art may employ different methods to implement the described functions with respect to each of the particular applications, but the implementations should not be considered as extending beyond the scope of the present application.

The steps of the method or algorithm described with reference to the embodiments disclosed herein may be implemented directly by using hardware, a software module executed by a processor or a combination thereof. The software module may be embedded in a Random Access Memory (RAM), an internal memory, a read-only memory (ROM), an electrically programmable ROM, an electrically erasable programmable ROM, a register, a hard disk, a removable disk, a CD-ROM, or a storage medium in any other form well known in the art.

The establishing method of a remote replication relationship, the establishing apparatus, the computing device and the non-transitory readable storage medium according to the present application are described in detail above. The principle and the embodiments of the present application are described herein with reference to the particular examples, and the description of the above embodiments is merely intended to facilitate to comprehend the method according to the present application and its core concept. It should be noted that a person skilled in the art may make improvements and modifications on the present application without departing from the principle of the present application, and all of the improvements and modifications fall within the protection scope of the claims of the present application.

The invention claimed is:

1. An establishing method of a remote replication relationship, comprising:

based on a port group of a local device, a port group of a remote device, and a virtual Internet-Protocol-address datum corresponding to each of port groups, generating a replication-link table;

based on service-requirement information, selecting a corresponding replication link from the replication-link table; and based on the replication link, establishing a remote replication relationship between the local device and the remote device that are corresponding to each other, and performing remote replication;

wherein based on the port group of the local device, the port group of the remote device, and the virtual Internet-Protocol-address datum corresponding to each of the port groups, generating the replication-link table comprises:

classifying service ports of each of storage nodes of the local device, to obtain the port group of the local device;

classifying service ports of each of storage nodes of the remote device, to obtain the port group of the remote device;

performing virtual-Internet-Protocol-address configuring to each of port groups of the local device and each of port groups of the remote device, to obtain the virtual Internet-Protocol-address datum corresponding to each of the port groups; and based on each of the port groups of the local device, each of the port groups of the remote device, and the virtual Internet-Protocol-address datum corresponding to each of the port groups, generating the replication-link table, wherein data of each of replication links in the replication-link table include a name of the port group of the local device, a name of the port group of the remote device, a local virtual Internet Protocol address and a remote virtual Internet Protocol address.

2. The establishing method according to claim 1, wherein classifying the service ports of each of the storage nodes of the local device, to obtain the port group of the local device comprises:

accumulating ports of storage nodes of a same controller in the service ports of each of the storage nodes of the local device, to obtain redundant ports, wherein the ports include a gigabit port and/or a 10-gigabit port; and by using ports of storage nodes of different controllers in the service ports of each of the storage nodes of the local device and all of the redundant ports, forming the port group of the local device.

3. The establishing method according to claim 1, wherein classifying the service ports of each of the storage nodes of the remote device, to obtain the port group of the remote device comprises:

accumulating ports of storage nodes of a same controller in the service ports of each of the storage nodes of the remote device, to obtain redundant ports, wherein the ports include a gigabit port and/or a 10-gigabit port; and by using ports of storage nodes of different controllers in the service ports of each of the storage nodes of the remote device and all of the redundant ports, forming the port group of the remote device.

4. The establishing method according to claim 1, wherein performing virtual-Internet-Protocol-address configuring to each of the port groups of the local device and each of the port groups of the remote device, to obtain the virtual Internet-Protocol-address datum corresponding to each of the port groups comprises:

performing same-network-segment virtual-Internet-Protocol-address configuring to each of the port groups of the local device and each of the port groups of the remote device, to obtain the virtual Internet-Protocol-address datum corresponding to each of the port groups.

5. The establishing method according to claim 1, wherein the port groups include a gigabit port group and a 10-gigabit port group, and based on each of the port groups of the local device, each of the port groups of the remote device, and the virtual Internet-Protocol-address datum corresponding to each of the port groups, generating the replication-link table comprises:

based on each of gigabit port groups of the local device, each of gigabit port groups of the remote device, and the virtual Internet-Protocol-address datum corresponding to each of the gigabit port groups, generating a gigabit replication-link table; and based on each of 10-gigabit port groups of the local device, each of 10-gigabit port groups of the remote device, and the virtual Internet-Protocol-address datum corresponding to each of the 10-gigabit port groups, generating a 10-gigabit replication-link table.

6. The establishing method according to claim 1, wherein based on the service-requirement information, selecting the corresponding replication link from the replication-link table comprises:

based on the service-requirement information, selecting an initial replication link from the replication-link table;

performing connectivity check to the initial replication link; and when the connectivity check passes, using the initial replication link as the replication link.

7. The establishing method according to claim 6, wherein based on the service-requirement information, selecting the initial replication link from the replication-link table comprises:

based on a data-synchronization speed in the service-requirement information, selecting the initial replication link from the replication-link table.

8. The establishing method according to claim 7, wherein the replication-link table comprises a gigabit replication-link table and a 10-gigabit replication-link table, and based on the data-synchronization speed in the service-requirement information, selecting the initial replication link from the replication-link table comprises:

when the data-synchronization speed is greater than a preset speed, selecting the initial replication link from the 10-gigabit replication-link table; and when the data-synchronization speed is less than or equal to the preset speed, selecting the initial replication link from the gigabit replication-link table.

9. The establishing method according to claim 6, wherein performing the connectivity check to the initial replication link comprises:

performing the connectivity check to the initial replication link by using a ping instruction.

10. The establishing method according to claim 1, wherein based on the replication link, establishing the remote replication relationship between the local device and the remote device that are corresponding to each other, and performing the remote replication comprises:

based on a virtual Internet Protocol address corresponding to the local device and a virtual Internet Protocol address corresponding to the remote device in the replication link, performing establishing-instruction transmission; and based on the received establishing instruction, establishing the remote replication relationship between the local device and the corresponding remote device, and performing the remote replication.

11. The establishing method according to claim 1, wherein the method further comprises:

after the local device and the remote device have established the remote replication relationship, monitoring health-state data of all of replication links in real time, and recording alarming-log information.

12. The establishing method according to claim 11, wherein the method further comprises:

sending the health-state data to a terminal of a user with a preset period.

13. The establishing method according to claim 1, wherein the method further comprises:

when a port in the port groups corresponding to the replication link malfunctions, switching the virtual Internet Protocol address corresponding to the port groups to another usable port in the port groups, and performing data reproduction based on a new port corresponding to the replication link.

14. The establishing method according to claim 13, wherein the method further comprises:

when a port in the port groups corresponding to the replication link malfunctions, recording failure information, and writing the failure information into alarming-log information.

15. The establishing method according to claim 1, wherein the method further comprises:

when a port group corresponding to the replication link malfunctions, labeling a state of the replication link to be malfunctioning, and sending a port-group-malfunctioning message.

16. The establishing method according to claim 15, wherein the method further comprises:

selecting another usable replication link, and providing service based on the replication link.

17. A computing device, wherein the computing device comprises:

a memory configured for storing a computer program; and a processor configured for, when executing the computer program, implementing operations comprising:

based on a port group of a local device, a port group of a remote device, and a virtual Internet-Protocol-address datum corresponding to each of port groups, generating a replication-link table;

based on service-requirement information, selecting a corresponding replication link from the replication-link table; and based on the replication link, establishing a remote replication relationship between the local device and the remote device that are corresponding to each other, and performing remote replication;

wherein the operation of, based on the port group of the local device, the port group of the remote device, and the virtual Internet-Protocol-address datum corresponding to each of the port groups, generating the replication-link table comprises:

classifying service ports of each of storage nodes of the local device, to obtain the port group of the local device;

classifying service ports of each of storage nodes of the remote device, to obtain the port group of the remote device;

performing virtual-Internet-Protocol-address configuring to each of port groups of the local device and each of port groups of the remote device, to obtain the virtual Internet-Protocol-address datum corresponding to each of the port groups; and based on each of the port groups of the local device, each of the port groups of the remote device, and the virtual Internet-Protocol-address datum corresponding to each of the port groups, generating the replication-link table, wherein data of each of replication links in the replication-link table include a name of the port group of the local device, a name of the port group of the remote device, a local virtual Internet Protocol address and a remote virtual Internet Protocol address.

18. A non-transitory readable storage medium, wherein the non-transitory readable storage medium stores a computer program, and the computer program, when executed by a processor, implements operations comprising:

based on a port group of a local device, a port group of a remote device, and a virtual Internet-Protocol-address datum corresponding to each of port groups, generating a replication-link table;

based on service-requirement information, selecting a corresponding replication link from the replication-link table; and based on the replication link, establishing a remote rep-
lication relationship between the local device and the
remote device that are corresponding to each other, and
performing remote replication;

wherein the operation of, based on the port group of the
local device, the port group of the remote device, and
the virtual Internet-Protocol-address datum corre-
sponding to each of the port groups, generating the
replication-link table comprises:

classifying service ports of each of storage nodes of the
local device, to obtain the port group of the local
device;

classifying service ports of each of storage nodes of the
remote device, to obtain the port group of the remote
device;

performing virtual-Internet-Protocol-address configuring
to each of port groups of the local device and each of
port groups of the remote device, to obtain the virtual
Internet-Protocol-address datum corresponding to each
of the port groups; and based on each of the port groups of the local device, each
of the port groups of the remote device, and the virtual
Internet-Protocol-address datum corresponding to each
of the port groups, generating the replication-link table,
wherein data of each of replication links in the repli-
cation-link table include a name of the port group of the
local device, a name of the port group of the remote
device, a local virtual Internet Protocol address and a
remote virtual Internet Protocol address.

\*   \*   \*   \*   \*